United States Patent [19]
Durham

[11] Patent Number: 5,532,998
[45] Date of Patent: Jul. 2, 1996

[54] OPTICAL SPECTROSCOPIC INFORMATION STORAGE

[75] Inventor: Jayson T. Durham, San Diego, Calif.

[73] Assignee: Serotech, Inc., Irvine, Calif.

[21] Appl. No.: 389,125

[22] Filed: Feb. 14, 1995

[51] Int. Cl.[6] .................................................. G11B 7/00
[52] U.S. Cl. ........................ 369/116; 369/108; 369/283; 365/125
[58] Field of Search .................................... 369/180, 103, 369/108, 109, 116, 275.1, 275.4, 283, 288; 356/125; 372/20

[56] References Cited

U.S. PATENT DOCUMENTS

| | | |
|---|---|---|
| 4,549,807 | 12/1985 | Hoffmaster . |
| 4,903,272 | 2/1990 | Simic-Glavaski . |
| 4,998,236 | 3/1991 | Henshaw . |
| 4,999,810 | 3/1991 | Vo-Dinh . |
| 5,124,944 | 6/1992 | Suzuki et al. . |
| 5,126,996 | 6/1992 | Iidg et al. ................................ 369/283 |
| 5,136,572 | 8/1992 | Bradley .................................. 369/108 |
| 5,191,574 | 3/1993 | Henshaw et al. ....................... 369/100 |
| 5,255,262 | 10/1993 | Best et al. ............................. 369/275.1 |
| 5,264,693 | 11/1993 | Shimabukuro et al. ................ 250/207 |
| 5,276,695 | 1/1994 | Sheps ...................................... 372/20 |
| 5,289,407 | 2/1994 | Strickler et al. . |
| 5,293,567 | 3/1994 | Terao et al. ............................... 369/94 |
| 5,297,076 | 3/1994 | Jefferson et al. . |
| 5,305,301 | 4/1994 | Ohga ...................................... 369/283 |
| 5,306,904 | 4/1994 | Shimabukuro et al. ................ 250/207 |
| 5,307,358 | 4/1994 | Sheps ...................................... 372/20 |
| 5,319,629 | 6/1994 | Henshaw et al. ...................... 369/103 |
| 5,325,342 | 6/1994 | Vo-Dinh .................................. 369/13 |

OTHER PUBLICATIONS

Guibert, Laurent et al. "On-board optical joint transform correlator for real-time road sign recognition", *Optical Engineering*, Jan. 1995, vol. 34, No. 1.

*Primary Examiner*—Loha Ben
*Attorney, Agent, or Firm*—Knobbe, Martens, Olson & Bear

[57] ABSTRACT

An optical data storage system is disclosed in which information is encoded and decoded in the spectrally resolved optical properties of the storage medium. An optical storage medium scatters an incident light excitation into both elastic and inelastic light beams. The inelastically scattered light serves as an optical data storage channel, whereby the inelastic light scattering properties of the medium are modulated in accordance with the information to be encoded or decoded. The elastically scattered light is also used as a data channel as in conventional optical storage systems, as well as for control functions. By increasing the optical processing gain, relatively weak inelastic scattering channels may provide a signal:noise ratio sufficient for storage applications. Furthermore, incorporation of a plurality of independently addressable inelastic scattering channels increases the storage density of the medium.

23 Claims, 5 Drawing Sheets

OPTICAL SPECTROSCOPIC INFORMATION STORAGE

FIELD OF THE INVENTION

The present invention relates generally to information storage by optical means. In particular, the present invention pertains to improved optical information storage systems based on spectrally resolved optical interactions in a storage medium.

BACKGROUND OF THE INVENTION

Optical data storage systems store and retrieve large quantities of information on a suitably formed, optically accessible medium, such as a rotating "compact disc" (CD) or translating ribbon. The encoded information is usually accessed by focussing a laser beam onto a reflective data layer embedded in the medium and detecting the reflected light beam. In practice, usually both the medium and the light beam are moved to provide access over the entire data surface in a timely manner, yielding an acceptable data access time as well as data transfer rate. Various general types of optical data storage systems have been developed thus far. In a ROM (Read Only Memory) system, data is embedded in the medium at the time of manufacture and is not normally altered by the user. A WORM (Write Once Read Many) system, on the other hand, allows a user to write information into the medium, and thereafter remains unaltered. Such systems are particularly suitable for archives because of their exceptionally high data densities and potentially low cost-per-byte. Erasable optical systems, such as magneto-optic or phase change recording, are also becoming more competitive and may some day supplant conventional magnetic recording as the cornerstone of machine-readable data storage. Unfortunately, due to opto-mechanical constraints and conventional optical data structure, access time in many optical storage systems is not yet competitive with conventional magnetic disc systems. Nevertheless, whereas magnetic data storage systems provide good access time and erasability, optical data storage can provide a unique combination of superior performance features that make them most appropriate for large memory applications. Indeed, despite of their present shortcomings, optical information storage systems promise to offer low cost-per-byte, improved access characteristics and unparalleled storage density.

With the explosive growth of information technology, the horizons of information processing and data storage applications are expanding rapidly. Yet, full motion high resolution video/audio and document image processing are not practical with current CD-ROM technology. Double-, triple- and quadruple-density/speed CD-ROM may be readily available in the near future. However, the data transfer rates necessary for full-motion video tax the current and near future CD-ROM capabilities for providing such high profile items as full-length feature films. So-called information super highways may augment CD-ROMs, but these high speed networks will require new higher capacity drives that can locally store and transfer information. Other examples, such as digital cameras or 3-D image displays, will undoubtedly create additional demands on high capacity data storage technology. Moreover, considering the current growing popularity of optical CDs and CD-ROMs, backward compatibility of any new storage technology is highly desirable, thus placing additional constraints on design and economic considerations. With the emergence of the information age and associated data intensive applications, there is clearly a demand for higher density information storage capabilities.

In most commercial optical storage systems, such as the CD-ROM, digital data is decoded by virtue of an optical intensity modulation reflected from a data layer embedded in the storage medium. A noteworthy exception is that of magneto-optical storage media wherein a magnetic material induces a change in light polarization rather than light intensity. Still in others, optical phase may be modulated by local changes in refractive index, which however, ultimately gives rise to intensity changes during the read process. The signal:noise ratio in commercial CD-ROMs is sufficient to provide bit error rates compatible with the computer industry, typically better than about $10^{-12}$. With current CD-ROM storage capacity at about 1 GB and transfer rates at about 1 MBps, CD-ROM has enjoyed a popular growing consumer base oriented to multimedia and other data intensive applications. Likewise, maintaining consumer interest mandates increased storage capabilities for anticipated new applications.

It is generally acknowledged that increasing the areal storage capacity of conventional optical CDs demands increasing the areal density of the pits and lands that comprise a conventional data layer. In addition, increasing the areal data density of an optical CD will also entail changes in optical and tracking hardware. For example, a shorter wavelength laser light source is generally recognized as a high leverage technique for increasing storage capacity. Indeed, in most conventional optical storage arrangements, the light source wavelength sets the fundamental limit for areal packing density. Unfortunately, efforts to produce a cost-effective blue laser have proven time-consuming and costly, with limited success thus far. Factoring in all-near term improvements to conventional CD-ROM technology, a single-layer areal density may be expected to increase by only a factor of 4× to 10×.

Considering briefly the optical interactions within a storage medium, typically electromagnetic radiation is scattered or re-radiated by matter at the same wavelength as the exciting radiation. Such common macroscopic phenomena as reflection and refraction of light are prime examples of "elastic" light scattering. CD-ROMs utilize these effects in generating the optical signal. However, when a material absorbs part of the incident electromagnetic energy, it may be possible for it to emit radiation at another wavelength, comprising a so-called "inelastic" light scattering process. Radiation-induced electronic, vibration or rotational transitions in molecules comprise a large portion of the commonly observed inelastic light scattering processes. At least in principle, the ability to analyze and control the optical emission spectrum of a selected material provides additional means by which to optically encode information. Until recently however, little commercial progress has been made in storage media which exploit potential multi-wavelength optical interactions. Such processes may for example include spectral hole-burning, fluorescence or nonlinear optical interactions. Nevertheless, because of the potential massive increase in storage capacity, so-called frequency domain or spectrally based storage mechanisms have continued to attract considerable attention.

In 1928, the Indian Physicist C. V. Raman discovered a new optical interaction characterized in that the wavelength of a small fraction of the radiation scattered by certain molecules differs from that of the incident beam. Furthermore, the shifts in wavelength depend upon the detailed physical and chemical composition of the molecules responsible for the scattering. He was subsequently awarded the 1930 Nobel prize in physics for this discovery and his systematic exploration of it. With the advent of lasers, Raman scattering, as it has come to be called, has evolved into a powerful analytical tool used by physicists, chemists and clinicians worldwide.

Today Raman spectroscopy is typically performed by irradiating a sample with a powerful laser source of visible or infrared monochromatic radiation. During irradiation, the spectrum of the scattered radiation is measured with a suitable spectrometer. At best, Raman intensities are: about $10^{-6}$ or less of the source intensity. Consequently, their detection and measurement is difficult and has received much attention from various research communities over the years. Resonance Raman Spectroscopy (RRS) significantly enhances the Raman efficiency by essentially tuning the exciting radiation to an electronic absorption peak of the Raman active material. Another relatively recent and useful technique comprises obtaining enhanced Raman spectra of materials which are deposited on colloidal metal particles or rough metal surfaces, particularly silver, gold or copper surfaces. Appropriately dubbed "Surface-Enhanced Raman Scattering" (SERS), such effects, although not fully understood, can yield Raman enhancements from $10^3$ to $10^6$. The combination of RRS and SERS techniques have rendered Raman spectroscopy an invaluable tool in clinical and biophysical research.

As a so-called second order optical process, historically Raman scattering was believed to be suitable for primarily analytical purposes. Recently, however, Surface Enhanced Raman Scattering (SERS) has been proposed for use as a means for optical data storage in a paper by T. Vo-Dinh and D. L. Stokes entitled "Surface-Enhanced Roman Optical Data Storage: A New Optical Memory With Three-Dimensional Data Storage", *Rev. Sci. Instrum.*, Vol. 65(12), p. 3766, 1994. U.S. Pat. No. 4,999,810 by T. Vo-Dinh, herein incorporated by reference, discloses the use of a SERS active media for the purpose of optical data storage. As disclosed by Vo-Dinh, a Raman active medium is deposited on a SERS-promoting substrate in a manner which yields enhanced Raman light emission of the medium when irradiated with light of the appropriate wavelength. Preferably, such a process and sensing means should be efficient enough to yield a signal:noise ratio acceptable for data storage and transfer applications. In a proposed write procedure, reminiscent of other optical recording systems, the microenvironment of the SERS medium may be altered in accordance with the data to be stored. In a subsequent read process, the emission or absorption characteristics of the medium will be modulated and detected in accordance with stored data. U.S. Pat. No. 5,325,342 by Tuan Vo-Dinh, also herein incorporated by reference, discloses the application of SERS active media for erasable optical data storage. This patent further discloses the potential for increased data storage density by exploiting multiple SERS layers, in addition to incorporating optical near-field techniques. Despite the acknowledged potential for high capacity optical storage, there is no specific mention of how the spectral characteristics of SERS-based medium would benefit optical data storage. Indeed, it is well known that in spite of surface enhancement contributions to Raman scattering, the total relative scattered energy is still very small compared to that of commercial optical data storage systems.

SUMMARY OF THE INVENTION

An object of the present invention is to provide an improved optical information storage system having increased data storage density and increased data transfer rate. Another object of the present invention is to exploit optical interactions in a storage medium having multi-wavelength characteristics such as inelastic light scattering processes. It is a further object of the present invention to multiplex data storage channels by virtue of characteristic radiation emitted in independently addressable optical processes.

In accordance with one aspect of the present invention, an apparatus for optical information storage comprises a light source that supplies light excitation having a predetermined excitation wavelength, and a data storage medium which emits light having a second wavelength in addition to the excitation wavelength in response to excitation by the light source. The apparatus for optical information storage further comprises a processor which provides wavelength discrimination of the light emitted from the data storage medium and a light sensor which detects light emission from the data storage medium independently at the first and second emitted light wavelengths. While the data storage medium should emit light having at least one wavelength in addition to the excitation wavelength, it is preferable for the data storage medium to emit light having a plurality of wavelengths in response to excitation by the light source. Furthermore, it is preferable for the plurality of wavelengths to correspond to independently addressable optical processes, each of which may provide an optical data storage channel.

In accordance with another aspect of the present invention, an optical data storage medium comprises a host material which provides optical access for light excitation at a first predetermined wavelength and a spectrally active material supported by said host material, whereby the spectrally active material emits light at a second predetermined wavelength in response to light excitation at the first predetermined wavelength. The optical data storage medium preferably also comprises a material that scatters or emits light at the first predetermined wavelength in response to light excitation at that same predetermined wavelength, such as would be found in conventional optical data storage media. Furthermore, the optical data storage medium preferably comprises a plurality of spectrally active materials supported by the host material, whereby each spectrally active material emits characteristic electromagnetic radiation substantially independently from each other in response to light excitation at the predetermined excitation wavelength.

In accordance with yet another aspect of the present invention, a method of encoding data comprises the steps of fabricating a host matrix, which comprises a material providing optical access for light excitation, and fabricating the matrix of spectrally active material supported by the host matrix. The method further comprises the step of modulating the optical properties of the spectrally active material in accordance with a data signal. The method of encoding data preferably comprises a process whereby the aforementioned modulating and fabricating steps are performed as a single process.

In yet another aspect of the present invention, an apparatus for reading optically encoded data comprises a light source which supplies light excitation having a first predetermined wavelength and a storage medium having optical properties which provide emission of electromagnetic radiation in response to excitation by the light source. The electromagnetic radiation is characterized as having at least a second wavelength different from the predetermined excitation wavelength. The apparatus further comprises an optical spectrum analyzer for the separation and detection of optical data channels occupying different wavelengths. In a preferred embodiment of an apparatus for reading optically encoded data, the optical spectrum analyzer comprises a processor which provides wavelength discrimination of the electromagnetic radiation and a light sensor for detecting the electromagnetic radiation independently at the first and at the second light wavelengths.

In still another aspect of the present invention, an optical information storage medium comprises a first material that elastically scatters an incident light excitation and a second material that inelastically scatters an incident light excitation. In such a preferred optical information storage medium, a method of encoding information comprises modulating the optical properties of material that inelastically scatters an incident light excitation. Furthermore, a method of decoding this information comprises supplying an incident light excitation to the optical storage medium, sensing the elastically scattered light, sensing the inelastically scattered light, thereby detecting changes ill the inelastically scattered light.

DETAILED DESCRIPTION OF THE PREFERRED EMBODIMENTS

Figure 1:
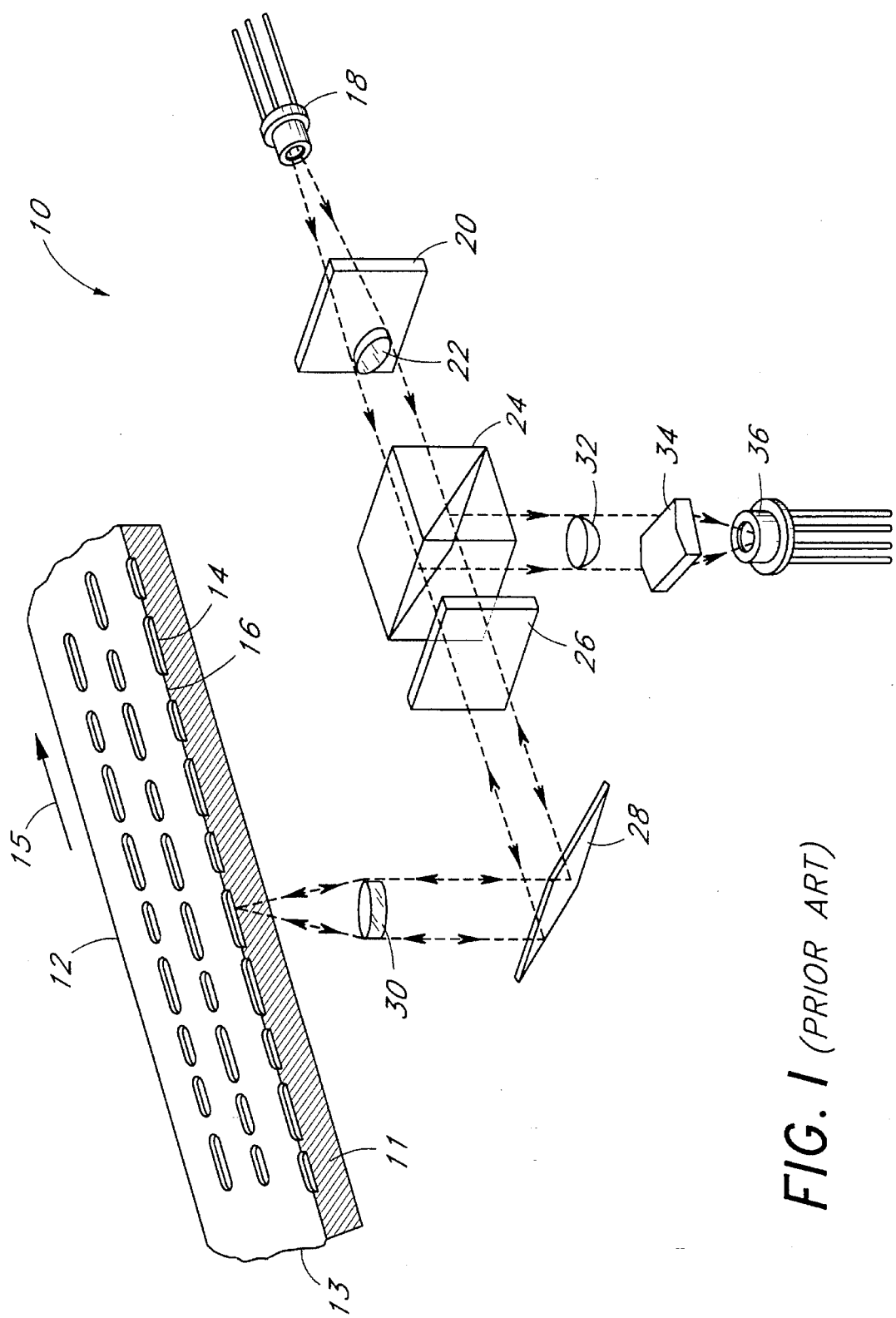
FIG. 1 is a schematic perspective of an exemplary CD-ROM optical storage system.

Because a major advantageous feature of the present invention is backward compatibility with an ever-growing installed base of CD-ROM optical systems, FIG. 1 outlines the basic operation of an optical storage system using the CD-ROM as an exemplary embodiment. It is important to note that the preferred optical data storage system described in the present application operates independently, and comprises an independent method and apparatus for encoding and decoding data optically. However, in accordance with the preferred embodiments, the optical data storage system disclosed in the present application operates advantageously in parallel with, and complementary to, conventional optical storage media such as CD-ROM, CD-WORM, and CD-Erasable (magneto-optic and phase change) optical storage systems. Accordingly a brief introduction to CD-ROM operation is provided.

As shown in FIG. 1, a CD-ROM optical data storage system comprises an optical storage medium 12 and associated optical and electro-optical components for the controlled transfer of radiant energy into, and away from, the storage medium 12. In the exemplary embodiment, the medium 12 basically comprises a transparent substrate 11 and a reflective data layer 13 comprising an array of so-called pits 14 and lands 16 over which the light beam scans. The light beam is typically supplied by a coherent light source 18 such as a solid state semiconductor laser, usually emitting in the near infrared or red regions of the spectrum, with emitted power of approximately 5 mW. The emitted light is passed through a diffraction grating 20 (optional), collimator lens 22, polarizing beam splitter 24, quarter-wave retarder 26, deflection mirror 28 and objective lens 30. The objective lens 30 focusses the incident light onto the storage medium 12 with a spot size nearly diffraction limited, typically about 1.7 μm in diameter. The desired nominal pit and land width is dependent upon the light spot size, scaling directly with the spot size. The focussed spot size in turn depends on the optical wavelength, scaling approximately with the wavelength. Recently great effort has been expended to provide a solid state laser operating at shorter wavelengths with concomitant increase in storage density.

The pits 14 are intended to create a substantially different optical path length relative to the lands 16 so that upon reflection from both the pits 14 and lands 16, destructive interference will result in a decreased reflected intensity. Accordingly, a preferred pit depth is approximately one quarter of the optical wavelength. As the incident light beam scans over the data layer 13, as indicated by the arrow 15 in response to movement of the media 12, for example, the reflected intensity is modulated in accordance with the spot position relative to the pits 14 and lands 16. Digital data may thus be encoded in a variety of ways into the data layer 13 as a sequence of pits 14 and lands 16, and accordingly optically reproduced based on the aforementioned physical contrast mechanism.

The reflected light intensity is collimated by objective 30 and passed back though the quarter-wave retarder 26. Since the reflected light has passed through the quarter wave retarder twice, it is transformed to a polarization state orthogonal to the incoming light beam and is thus reflected by the polarizing beam splitter 24. The reflected beam is thus deflected into the collection optics comprising a convex lens 32, cylindrical lens 34 and photodetector 36. The photodetector 36 senses the reflected light intensity and transforms the light intensity into an electrical current for subsequent processing. It is common for the photodetector 36 to comprise a quadrant photodiode which may be used for focussing and deflection servo controls as well as the encoded data signal.

In most commercial optical storage systems, such as the CD-ROM as described in connection with FIG. 1, digital data is encoded by virtue of an optical intensity modulation. A noteworthy exception is that of magneto-optical storage media wherein the magnetic media induces a change in light polarization rather than light intensity. Still in others, optical phase may be modulated by local changes in refractive index, which however, still gives rise to intensity changes during the read process. At least in principle, it has been acknowledged that the ability to analyze and control the optical emission spectrum of a selected material provides additional means by which to optically encode information. Until recently however, little commercial progress has been made in storage media which exploit multi-wavelength optical interactions such as spectral hole-burning, fluorescence or non-linear optical interactions.

Recently, however, Surface Enhanced Raman Scattering (SERS) has been proposed for use as a means for optical data storage. U.S. Pat. No. 4,999,810 by T. Vo-Dinh, herein incorporated by reference, discloses the use of a SERS active media for the purpose of optical data storage. As disclosed by Vo-Dinh, a SERS active medium is deposited on a SERS active substrate in a manner which promotes Raman emission of the medium when irradiated with light of the appropriate wavelength. In a write procedure, reminiscent of other optical recording systems, the microenvironment of the SERS medium may be altered in accordance with the data to be stored. In a subsequent read process, the emission or absorption characteristics of the medium will be modulated and detected in accordance with stored data. U.S. Pat. No. 5,325,342 by Tuan Vo-Dinh, also herein incorporated by reference, discloses the application of SERS active media for erasable optical data storage. This patent further discloses the potential for increased data storage density by exploiting multiple SERS layers, in addition to incorporating optical near-field techniques. Despite the acknowledged potential for high-capacity optical storage, there is no specific mention of how the spectral characteristics of SERS would benefit optical data storage. Indeed, it is well known that in spite of surface enhancement contributions to Raman scattering, the total relative scattered energy is still very small compared to that of commercial optical data storage systems. Hence, it seems that measuring the scattered intensity alone may not produce a signal:noise ratio compatible with commercial data storage requirements.

In accordance with the general principles of the present invention, a preferred optical storage medium should respond to an incident electromagnetic radiation in a wavelength-dependent manner. For example, a fluorescent or SERS active storage medium will emit radiation having spectral characteristics indicative of the physical and chemical nature of the medium. Such spectra, in general, possess a strong wavelength-dependent character which, in accordance with the present invention, can be exploited for optical processing gain. Additionally, a preferred medium may possess a wavelength-dependent absorptive characteristic such that incident radiation may be tuned to the specific material medium. Storage media having the aforementioned properties are herein defined as "spectrally active media." Thus, while a simple reflective layer used in most CD-ROM media does not utilize a wavelength-dependent optical interaction, it would not be characterized as spectrally active. On the other hand, media having, for example, fluorescent or SERS active material and wherein such optical interaction contribute to the data signal, then such media would be considered spectrally active. As described in more detail in the following sections, the present invention makes advantageous use of spectrally active materials incorporated into optical storage media. Potential limitations caused by the radiated power of spectrally active media are overcome by exploiting the wavelength-dependent features to increase optical processing gain.

Figure 2:
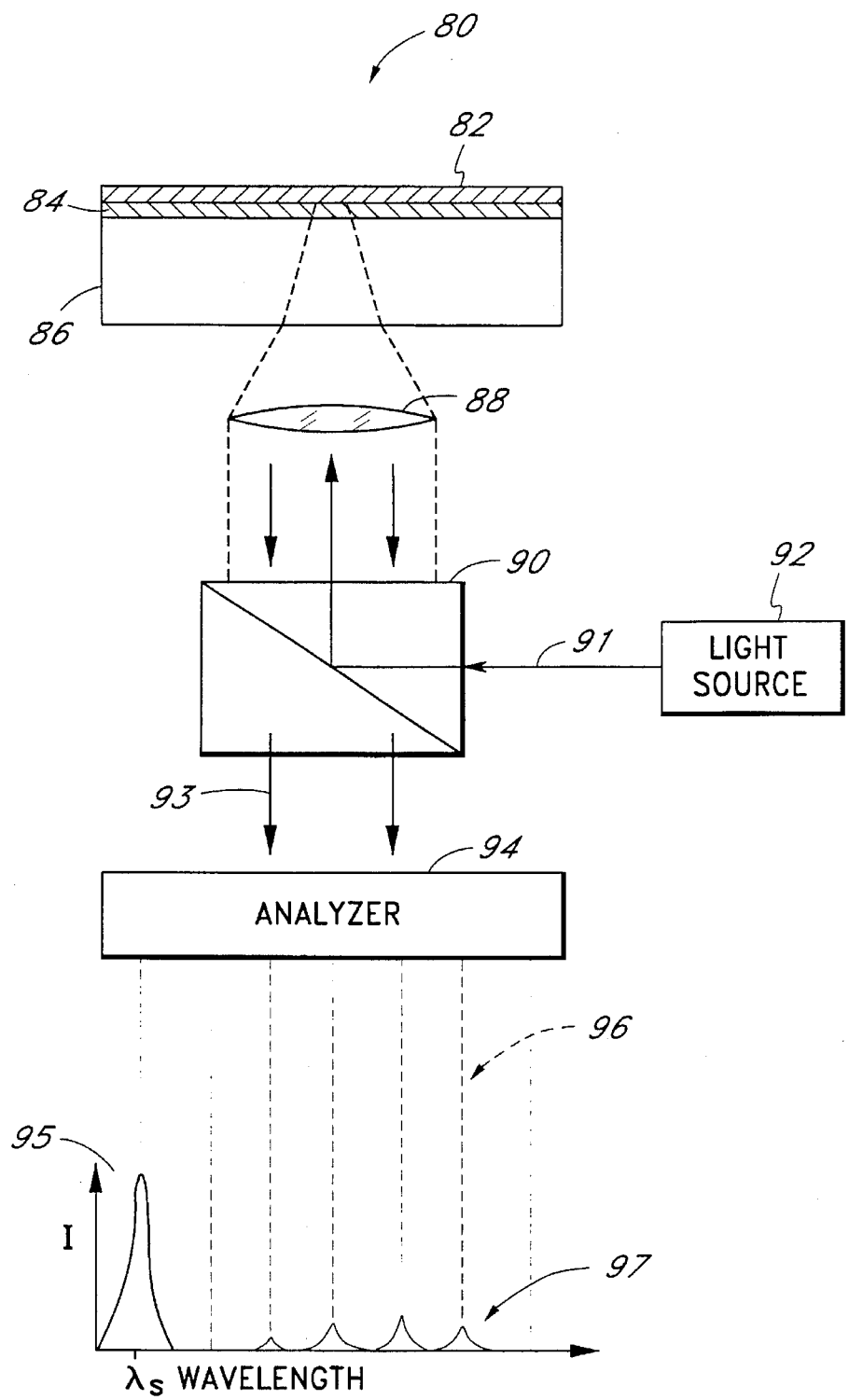
FIG. 2 is a simplified cross-sectional view of a spectrally active optical storage system in accordance with the principles of the present invention.

As shown in FIG. 2, a basic embodiment of an optical storage system utilizing optical spectroscopic characteristics comprises a storage medium 80 which interacts with the incident electromagnetic radiation in accordance with the aforementioned characteristics. A representative preferred embodiment of an optical storage medium may comprise a spectrally active data layer 84 sandwiched between a reflective top layer 82 and a transparent bottom layer 86. Information may be encoded into the spectrally active data layer 84 in the form of a physical or chemical modulation of the optical properties of the data layer 84. Optical interaction with the storage medium 80 is provided by the optical processing hardware comprising a light source 92, suitable beam optics such as a beam splitter 90, objective lens 88, and analyzer 94. The light source 92 is preferably tunable, supplying incident light 91 at a plurality of selectable light wavelengths $\lambda_s$ to the storage medium 80. Light incitation 91 is supplied to the storage medium 80 through a beam splitter 90 and focused to a preselected spot size using objective lens 88.

Light emission from the irradiated portion of the storage medium 80 is transmitted to the optical signal analyzer 94 through objective lens 88 and beamsplitter 90. In the basic embodiment depicted in FIG. 2, the optical signal analyzer 94 may represent a general class of processors whose function is to generate one or more signals based upon light wavelength discrimination. For example, the analyzer may comprise a wavelength selective filter and optical detector arrangement capable of measuring the emitted light intensity at a preselected range of wavelengths. More generally, the analyzer 94 should supply a signal representative of the emitted light intensity at a plurality of emission wavelengths and preferably a signal comprising a quasi-continuum wavelength spectrum of the emitted light 96. The spectrum 96 will in general comprise a signal 95 having a magnitude corresponding to the intensity of light at source wavelength $\lambda_s$. Moreover, the intensity of substantially every wavelength of light emitted by medium 84 will be represented as a corresponding signal 97 supplied by analyzer 94. The spectra of emitted radiation 97, other than source wavelength 95, represents a signature for light emission under the specific conditions of operation, thus allowing information encoding by virtue of changes in the spectra 97.

In accordance with the principles of the present invention, a spectrally based optical data storage system should preferably comprise a means for encoding data into a material medium. In general, data is encoded into a storage medium such as to modulate the optical emission or absorption spectrum of the medium when irradiated by light of a suitable wavelength. For example, if the storage medium is fluorescent in nature, then data may be encoded by photobleaching or ablative processes well known in the art. The data to be encoded is provided as a modulation of the aforementioned physical, chemical, or optical processes. In a subsequent read-back procedure, the optical emission or absorption of the medium will be modulated by the encoded data.

Consistent with the general principles of the present invention, the detailed mechanism of the optical interaction is not presently conceived to be as critical as the multi-wavelength nature of the interaction. Thus, several types of molecular systems may be used as a spectrally active data layer. A preferred system utilizes molecular systems used in luminescence, Raman, reflection, and absorption (color) changes. For example, molecules such as inorganic or organic chemicals that have reversible or irreversible molecular states or phytochrome pigments that are used in conventional erasable optical storage systems are preferred; such chemicals include phthalocyanine pigments, cyanine-based pigments, amino compounds, nitro compounds, quinone systems, and benzthiopyrane, etc. Under laser radiation (the: write procedure), these systems undergo molecular state changes and such changes show up as a change in their SERS frequencies and/or SERS signal intensities when illuminated with an appropriate read beam as previously described. Also, new types of chemicals exhibiting molecular-state changes involving electronic, vibrational, rotational, and charge-transfer processes which have been developed can be adapted for use in this embodiment as a substitute for the preferred optical layer.

In a preferred system based on reversible molecular state changes, the optical layer in the blank state consists of particles having a uniform molecular state. In a write procedure, a write beam of an appropriate type based upon the nature of the molecular state is utilized to impart a changed molecular state on molecules or groups of molecules where data are to be written. Such molecules would then be in a different state from the other molecules, and when illuminated with appropriate radiation exhibit changed SERS emission. In a delete procedure, an appropriate delete beam would be used to reverse the molecular state change to the original or blank molecular state so that the particles once again return to a uniform molecular state.

Although there are many general types of optical interactions having a multi-wavelength character, most are believed to be too weak to be practical in a conventional optical system. In particular, the relative optical power scattered into the spectrally active, multi-wavelength components is typically much smaller than the primary (elastically scattered) component comprising reflected or refracted light at the incident wavelength. Thus, one perceived problem is that the resulting signal:noise ratio of additional data channels may not be sufficient to provide an effective storage medium. However, in accordance with the general principles of the present invention, improving the optical processing gain in the spectrally active data channels can, in part, compensate for the relatively low scattered power, rendering an improved signal:noise ratio. Furthermore, since a scattered component of optical power is considerably smaller than the incident optical power, a multiplicity of independently scattering components may be incorporated into a single data medium. Hence, a single data medium may comprise a multiplicity of independent data components, each interacting with the incident light beam or a plurality of incident light beams. Provided there is sufficient processing gain to decode each of a multiplicity of spectrally active channels, the data capacity of the medium will be multiplied by the number of such data channels. Moreover, because the relative optical power scattered into spectrally active channels is small, the number of such channels may be increased with minimal impact on system operation.

A further advantageous operation of the present invention is that such an arrangement of additional spectrally active data channels may be incorporated in conventional optical storage media such as CD-ROMs. In most conventional optical storage media, the primary optical signal wavelength is the same as the incident wavelength. The addition of spectrally active data channels does not significantly affect the primary signal power, thus allowing such a medium to operate in the conventional, as well as spectrally active, fashion. Thus, it is possible to utilize all of the advantageous features of the spectrally active medium while still retaining use of the primary signal channel.

Hence, in accordance with the general principles of the present invention, the storage density of an optical medium is increased by splitting the available optical signal power into a plurality of spectrally active data channels. Preferred embodiments of a spectrally active optical storage media are disclosed in Section I below. Since the available optical signal power is split into a plurality of data channels, increasing the optical processing gain in each signal channel compensates for the decreased signal power scattered into each spectrally active data channel. The multi-wavelength character of the spectrally active data channels provides the means for increasing the optical processing gain, as described in Section II below. Thus, another aspect of the present invention comprises the preferred optical hardware to be used to increase the optical processing gain. Additional preferred embodiments of a spectrally active storage system comprise signal processing such as nonlinear regression algorithms and time series correlation. In general, such nonlinear regression algorithms account for measurable correlations between the spectrally active data channels and the primary data channel.

I. Spectrally Active Storage Medium

In accordance with the principles of the present invention, one embodiment of a preferred optical data storage medium comprises a material system whose optical absorptive properties are dependent upon an incident excitation wavelength, thereby enabling tunable selection of a plurality of such materials in a single storage medium. Furthermore, the optical emissive properties comprise the emission of electromagnetic radiation in response to optical excitation, the emitted electromagnetic radiation having at least one wavelength different from the excitation wavelength and preferably a plurality of emission wavelengths in response to an excitation wavelength. Material systems satisfying the aforementioned properties are herein defined as spectrally active, inasmuch as they absorb or emit a spectrum of electromagnetic radiation in response to a predetermined optical excitation. Such material systems may for example be a SERS active medium as described above and in reference to the incorporated U.S. patents, but may also comprise other optical processes such as fluorescence, luminescence, wave mixing or harmonic generation.

Another advantageous aspect of these media is that for a given input wavelength, one other or a plurality of emission wavelengths are generated. Such features enable optical analysis and signal processing to identify the emission feature even in the presence of low emissive power. Thus, the optical input power may be distributed over many low power output channels with a corresponding increase in data storage density. Moreover, when the emitted power is low compared to the power of the optical excitation, the spectrally active medium may be advantageously incorporated into existing optical data storage media without substantial degradation of existing performance. That is, only a small portion of the optical power is scattered into other wavelengths, allowing conventional use of the storage medium. It is anticipated that such spectrally active material systems are particularly appropriate for types of data which may sustain some degradation of signal:noise ratio and still be usable, such as audio, image or video data. Such data may be easily incorporated onto the more robust conventional CD-ROM media which may be reserved for types of data which cannot accommodate bit error degradation.

As shown in FIGS. 3A through 3E, there are a number of ways to incorporate spectrally active data layer(s) into existing optical storage media. For comparison, a conventional CD-ROM storage medium 40 is illustrated in cross section in FIG. 3A, and is shown as being comprised of a transparent polycarbonate substrate 42 through which the light is transmitted. The pits and lands previously described in connection with FIG. 1 are typically stamped into the substrate 42, over which a reflective layer of aluminum 44 is deposited. A protective lacquer coating 46 covers the aluminum layer 44 to prevent oxidation.

Figure 3A:
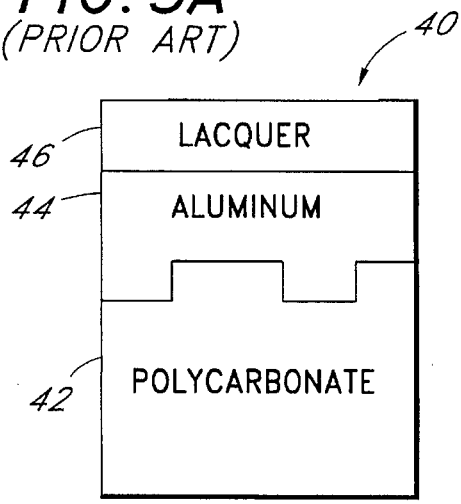
FIGS. 3A–3E are cross-sectional views of several embodiments of spectrally active optical storage media.
Figure 3B:
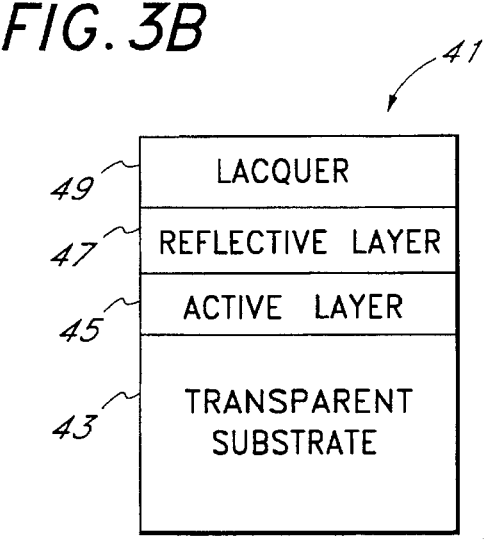

As shown in FIG. 3B, a basic embodiment of a preferred spectrally active medium 41 comprises a transparent substrate 43, a spectrally active layer 45, a reflective layer 47 and a protective lacquer 49.

Figure 3C:
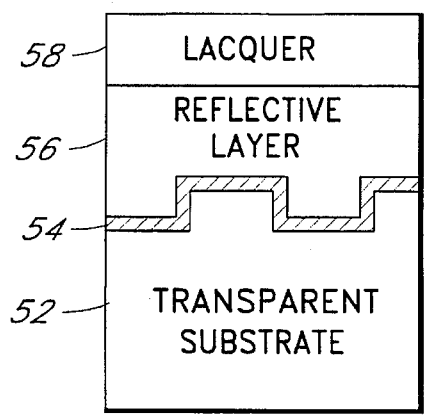

A basic preferred combination optical medium 50, shown in FIG. 3C, comprises a substrate 52, a spectrally active layer 54, a reflective layer 56 overlaying stamped or written pits and lands, and a lacquer top layer 58.

Figure 3D:
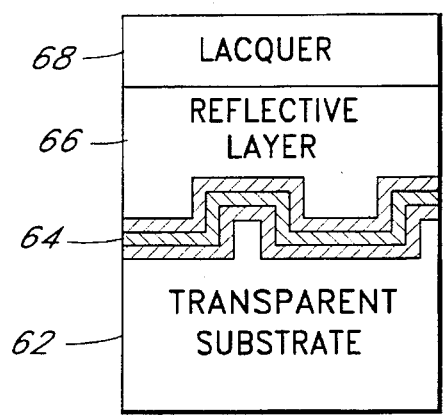

An improved, multi-spectral medium 60, shown in FIG. 3D, may comprise a similar basic structure to that of FIG. 3C, but includes a plurality of spectrally active data layers 64. Each data layer in FIG. 3D may be written with a different excitation wavelength or provide different emission spectra comprising a separate layer of encoded data.

Figure 3E:
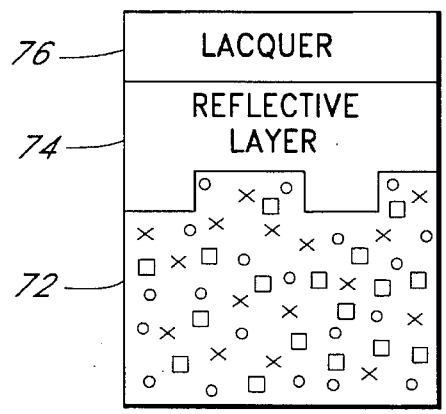

Another preferred embodiment of a spectrally active storage medium 70 shown in FIG. 3E comprises a substrate 72, a reflective layer 74 and a top layer 76. One or more spectrally active materials are homogeneously distributed throughout the substrate 72 as indicated by the small circles, x's and squares.

Incorporating a plurality of spectrally active data layers as shown in FIG. 3D or as one homogeneous layer as shown in FIG. 3E will provide distinct data encoding for each type of spectrally active material, based on their respective optical properties. When, for example, each spectrally active material possesses a different absorption wavelength or band of wavelengths, then encoded data in each material may be distinguished on the basis of the excitation wavelength. Alternatively, encoded data in each spectrally active material may be distinguished on the basis of their respective emissive properties.

A preferred method for encoding data into the spectrally active layers depicted in FIGS. 3D–3E comprises a selectively tuned optical interaction which alters the spectral properties of light emission or absorption. Such interactions may include photo-chemical reactions, photo bleaching or oblation. In general, a spectro-chemical or physical interaction causing reversible or irreversible changes in the optical properties may be exploited in a write process.

Still another preferred method of encoding data may take place at the time of medium manufacture. Specifically, data may be encoded into the data layer at the time of medium fabrication through a process reminiscent of CD-ROM stamping. For example, a one-time data encoding process may comprise thin film deposition, masking and photolithographic techniques. Thus, a one-time optical exposure process may encode data into the spectrally active layer. Alternatively, spectrally active material comprising the spectrally based data layer may be deposited selectively over the medium surface in accordance with the data to be encoded.

As will become clear in the present disclosure, a preferred spectrally active data layer may be incorporated into all existing optical storage media, while preserving the original storage process. Thus, for example, spectrally active layers may be incorporated into conventional CD-ROM, thereby adding the spectroscopic channel to the conventional physical data storage channel. Likewise, such preferred layers as outlined in the present application may be advantageously incorporated into magneto-optic, phase change or CD-recordable media, among others.

II. Optical System Hardware

Figure 4:
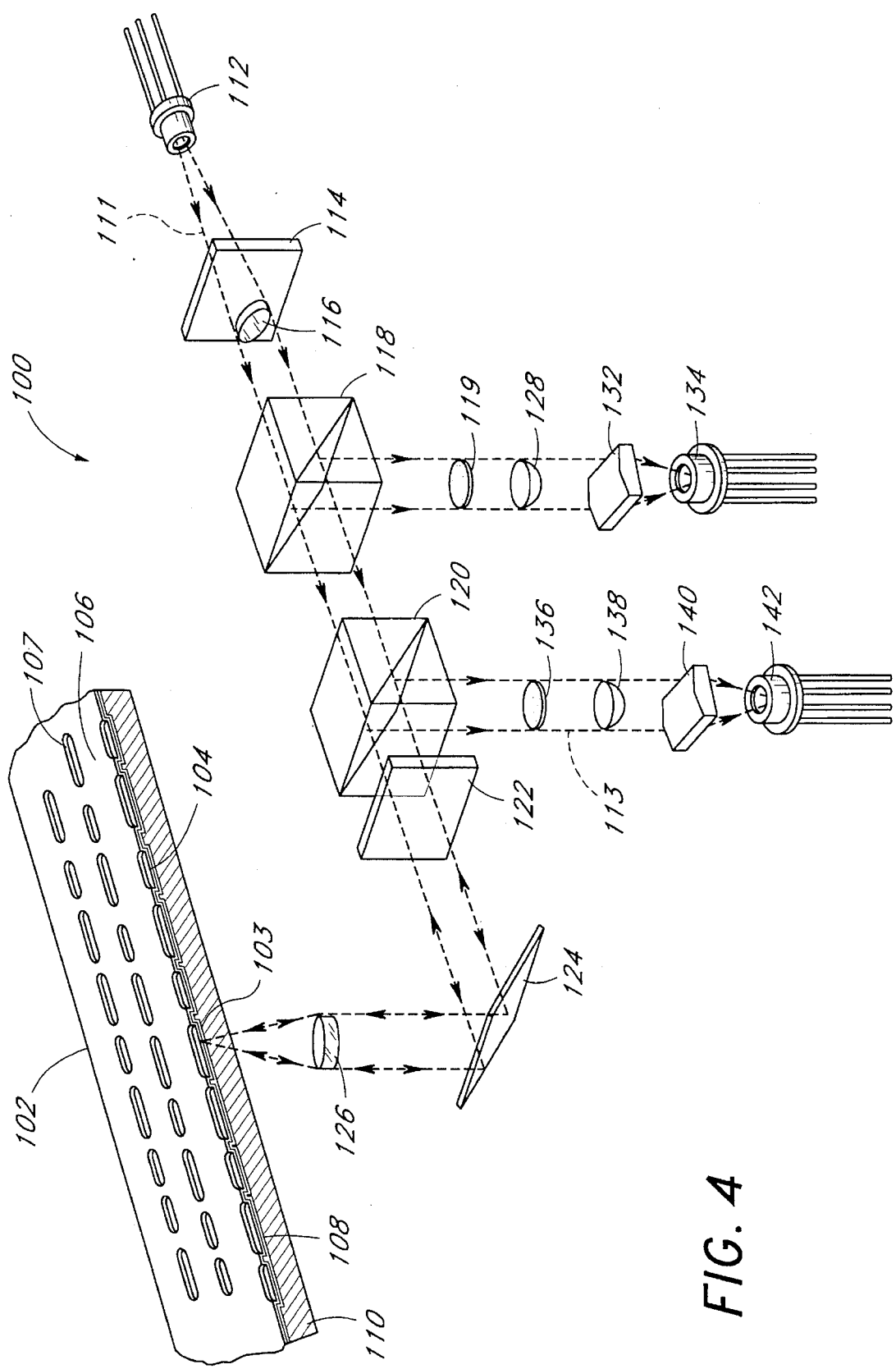
FIG. 4 is a simplified schematic perspective of an optical spectroscopic data storage system.

To exploit the benefits of a preferred optical storage medium, optical processing is used to analyze the emitted radiation and identify spectrally active data channels. As shown in FIG. 4, the basic embodiment of a preferred optical data storage system 100 comprises a spectrally active storage medium 102 disposed such that the data layer 108 lies substantially within the focal plane of an objective 126. The spectrally active storage medium 102 may for example comprise a substrate 110 supporting the data layer 108. The exemplary data layer 108 shown here comprises a spectrally active layer 103 and a reflective layer 104. The data layer 108 preferably also has information encoded in the form of physical pits 107 and lands 106. A read/write beam of light 111 is supplied by light source 112, preferably a laser light source having tunable or multi-wavelength capability. As described earlier in connection with the preferred embodiments of an optical storage medium, multi-wavelength read/write optical interactions are preferable to allow wavelength adjustment between optically active materials having different optical properties, such as optical absorption. Additionally, multi-wavelength differentiation between read and write processes based on both wavelength and optical power variations are possible with such preferred light source. Such light sources may, for example, comprise a laser diode array having multiple emission wavelengths. Alternatively, a superluminescent diode array may be employed where a plurality of luminescent diodes having different center frequencies each supply a quasi-broadband spectrum radiation. A preferred laser source for the present embodiment comprises a tunable solid-state laser. While tunable monolithic semiconductor lasers may not yet be practical, there are tunable solid-state lasers comprising various configurations of well-known solid-state laser crystals, such as Ti:Sapphire. For example, U.S. Pat. No. 5,276,695 by R. Scheps discloses a multifrequency, rapidly sequenced or simultaneously tunable solid-state laser comprising a solid-state laser crystal disposed within an adjustable laser cavity. Wavelength tuning can be accomplished by a simple angular rotation of an appropriate high reflectivity and element. Alternatively, U.S. Pat. No. 5,307,358, also by R. Scheps, discloses the wavelength dispersive gain element for a tunable solid-state laser. Featured here is a tunable laser in which the gain element is fabricated to produce wavelength dispersion within the laser resonant cavity. Specifically, the laser gain element has Brewster-angled entrance and exit faces which allow it to operate as a wavelength dispersive element while simultaneously performing the functions of an optical gain element within the laser cavity.

Incident light 111 is supplied to the storage medium 102 through a representative optical system comprising a diffraction grating 114, a collimating lens 116, a polarizing beam splitter 118, a dichroic beam splitter 120, a λ/4 retarder 122, a deflection mirror 124, and an objective 126. The incident light 111 is focused onto the data layer 108 of the storage medium 102 by objective 126, thereby stimulating the preferred optical processes. The ensuing reflected and emitted radiation at both the primary and spectrally active wavelength is recollimated at objective 126. Reflected light at the incident wavelength passes through the λ/4 retarder 122 and dichroic beam splitter 120 without deflection. It is then deflected by beam splitter 118, through bandpass filter 119, and focused onto detector 134 by lenses 128 and 132.

A second optical path 113 stemming from dichroic beam splitter 120 comprises a wavelength selective filter 136, such as an adjustable interference filter, focusing lenses 138, 140, and photodetector 142. Light emitted by spectrally active data layer 108 is collected and collimated by objective 126, and further deflected by dichroic beam splitter 120 along the optical path terminating at detector 142. The dichroic beam splitter 120 functions to separate the light emitted by the spectrally active data channels from that of the primary light wavelength. A specific wavelength of emitted light is further selected by filter 136, which may, for example, comprise an adjustable interference filter or wavelength dispersive spatial filter.

As mentioned previously, the optical power emitted into the spectrally active data channels may be substantially lower than that of the primary data channel. If so, then conventional Si photodetectors found in most CD-ROM systems may not allow a signal:noise ratio sufficient for data storage purposes. Preferred photodetectors for increased optical processing gain may comprise photomultiplier tubes (PMT) or Avalanche Photodiodes (APD) well-known in the art. To address space considerations, U.S. Pat. Nos. 5,264,693 and 5,306,904, both by R. Shimabukuro and S. Russel, herein incorporated by reference, disclose microelectronic PMT devices potentially well-suited for compact low-level light detection. Alternatively, Hamamatsu model OPTO-8 or Advanced Photonix VAPD may supply considerable gain for low-profile applications such as in the preferred optical storage system. Thus, while detector 134 monitors the reflected intensity variations due to the pits 107 and lands 106 of recording medium 102, detector 142 senses the encoded variation of emitted light from the spectrally active data layer 108.

In operation, information to be encoded or decoded may be accessed through the spectrally active data channel involving a multi-wavelength optical process. Additionally, in accordance with the principles of the present invention, data may be encoded or decoded in a primary data channel involving an optical process having only the incident light wavelength, such as through reflectivity or polarization changes caused by the medium. Thus, a spectrally active data channel may be advantageously incorporated into conventional CD-ROM, magneto optic, photorefractive or phase change type media. Light emerging from the storage medium having the source wavelength may additionally be used for tracking and control purposes just as in conventional optical storage systems.

The present embodiment herein disclosed further allows multi-wavelength optical data storage through either adjustment of light source 112 or filter 136, each of which may be adjusted to access a specific optical process in data layer 108. For example, the wavelength of light source 112 may be matched to specific absorption peaks in data layer 108. The absorption peak may be exploited in a write process, whereby a specific material dominates the radiation absorption, effecting physical or chemical changes in the specific material. Alternatively, the optical absorption may couple into enhanced emissive processes, such as resonant Raman emission, thus enhancing a material-specific read process. On the other hand, adjustment of wavelength filter 136 provides multiple detection channels corresponding to the pass wavelengths of the filter. For example, a monochromatic input beam may excite emission from a plurality of materials or optical processes, thus allowing a plurality of read channels corresponding to the independent emission processes. Finally, provided the optical power entering the detector 142 is relatively small compared to the power entering the detector 134, the data storage system may function substantially as a conventional CD-ROM storage system, in addition to having the spectrally active data storage information recorded by detector 142.

As described earlier, when the optical power transferred to the spectrally active data channels is much less than the primary or incident optical power, then the data storage system may be used in the conventional manner, as well as in the presently disclosed spectrally active manner. Moreover, when the scattered optical power is much less than the incident power, then a plurality of spectrally active channels may be excited by the same incident light beam. Thus, in a preferred optical storage system, the storage medium should accommodate a plurality of independently addressable optical processes, each of which provides a characteristic spectral signature.

Figure 5:
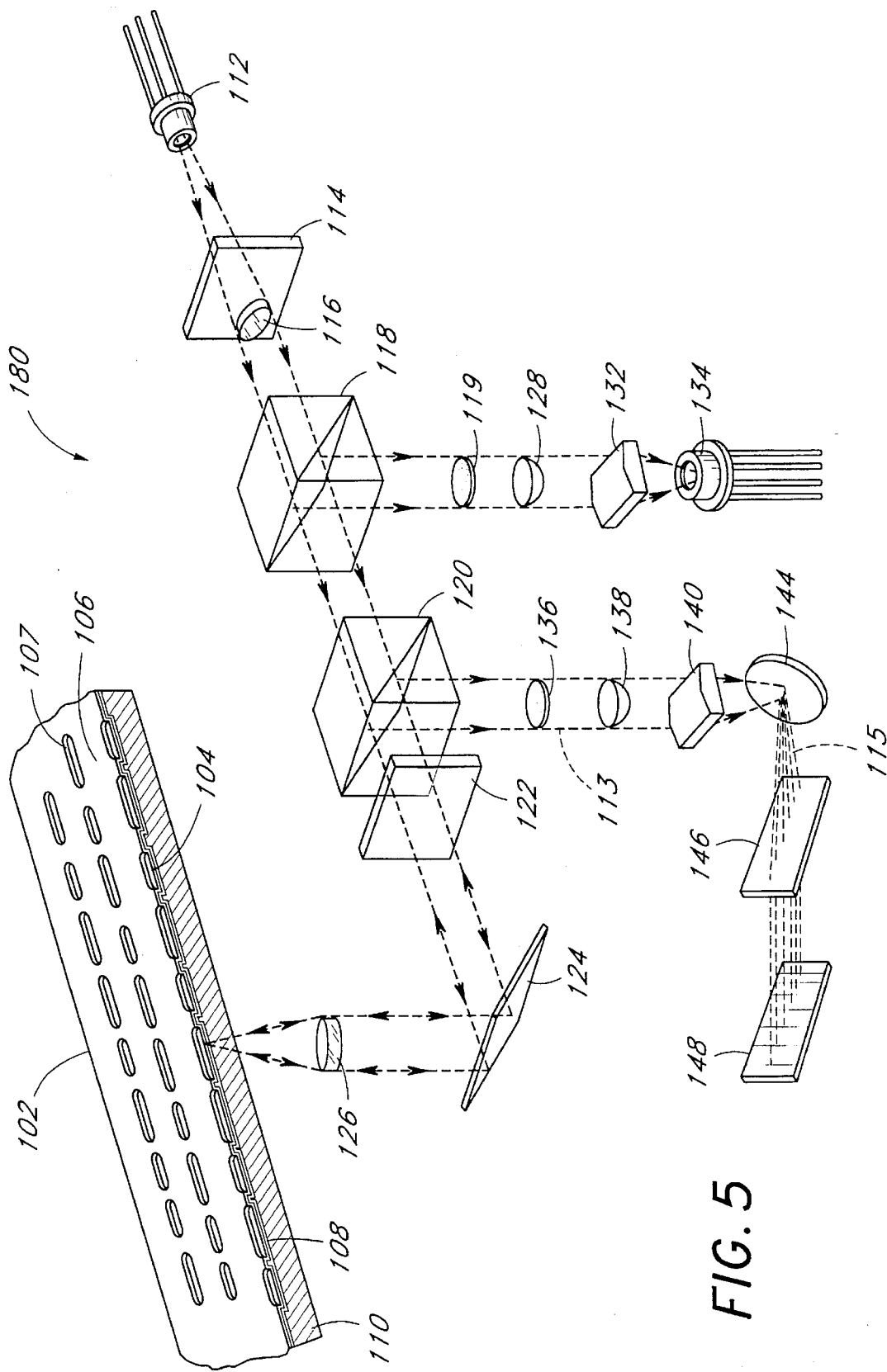
FIG. 5 is a schematic perspective of a preferred embodiment of an optical spectroscopic data storage system.

However, it is possible that these optical processes display such low emissive power that the signal:noise ratio is unacceptably low. Such compromised signal characteristics may produce either an unacceptably low bit rate or bit-error rate. Thus, it is desirable to augment the embodiment 100 disclosed in connection with FIG. 4 with optical processes designed to improve the optical signal:noise ratio. As shown by the system 180 in FIG. 5, a basic modification of the system of FIG. 4 may comprise replacing detector 142 with a combination comprising a wavelength dispersive element 144 followed by a spatial intensity modulator 146 and a detector array 148. The wavelength dispersive element 144 may, for example, comprise a prism, but preferably comprises a diffraction grating. The spatial light modulator 146 may comprise an array of independently addressable liquid crystal light valves well known in the art or alternatively, may comprise an array of electro-optic intensity modulators, or other equivalently functioning device. Furthermore, the detector array 148 may, for example, comprises a monolithic array of photodiodes, but preferably comprises an array of avalanche photodiodes providing greater sensitivity.

In the basic mode of operation, the emitted light along path 113 is directed onto the dispersive element 114, which functions to direct portions of the beam in accordance with the dispersive character of the element 144. In particular, the element 144 will direct the beam 115 in a wavelength-dependent manner, preferably distributing the beam over the active region of the spatial light modulator 146. When an emission spectra corresponding to a particular data channel is known beforehand, the spatial light modulator 146 may be configured to have a wavelength dependent transmissivity, thus functioning as an optical matched filter. Such a filter may, for example, be realized through an optically addressable spatial light modulator as disclosed in an article by L. Guibert, G. Kevyer, A. Servel, M. Attia, H. MacKenzie, P. Pellat-Piuet and J.-L. de Bougrenet de la Tocuaye, entitled "On-Board Optical Joint Transforum Correlator For Real-Time Road Sign Recognition," *Optical Engineering*, Vol. 34(1), pp. 135–139, 1995. In general, it is preferable to configure the spatial light modulator such that the transmissivity varies in accordance with the incident light intensity, thus providing a correlated measure of signal strength S:

$$S \propto \sum_i \hat{S}_i S_i$$

where $\hat{S}_i$ is an expectation value for the signal element $S_i$. The filtered light may be focused onto a sensitive detector, such as described previously in connection with FIG. 4, or in the present embodiment focused onto the detector array 148.

The light emitted from the irradiated portion of the storage medium is collimated by objective lens 126 and transmitted to the wavelength dispersive element 144, such as a prism or diffraction grating. In this preferred embodiment, a photodetector array 148 is employed to measure the spatial array of light intensity emerging from the analyzer or wavelength dispersive element 144. In accordance with the operation of the dispersive element 144 and configuration of detector array 148, individual detector signals will indicate the light intensity for a specific range of light wavelengths. For example, the light intensity at the source wavelength $\lambda s$ may be sensed by a particular detector in the array 148. Moreover, the intensity of every wavelength of light emitted by medium 108 will be represented as a corresponding signal measured by a detector in array 148. The spectra of emitted radiation, other than that at the source wavelength, represents a signature for light emission under the specific conditions of operation, thus allowing information encoding by virtue of changes in the emission spectra.

The detector array 148 allows measurement of the emitted light intensity over separately addressable wavelength intervals, such as found in optical multi-channel analysis. The intensity spectra measured by detector array 148 may comprise an emission spectra of a single data channel, in which case the correlated signals from elements in the detector array may be used to improve the signal:noise ratio. For example, a predetermined data channel may be identified by light emission at a plurality of wavelengths. While it is necessary to measure the light intensity at one wavelength, it is preferable to correlate detector elements operating at different wavelengths comprising emission from the data channel. Hence, for a given data channel, a plurality of detector elements comprising the detector array 148 will contribute to a correlated signal detection arrangement.

In another preferred embodiment entailing use of the detector array 148, a plurality of data channels may be identified simultaneously by correlated detector readings. For example, an emission spectra $S(\lambda_j)$ may serve as the signal for a particular data channel, where $S(\lambda_j)$ is the spectral intensity of a particular optical process and $\lambda_j$ is the wavelength corresponding to the j-th detector element. Several such data channels $S_k(\lambda_j)$ may be represented by the discrete array $a_{jk}$, whose elements represent the known relative signal strength for each data channel in each detector array element. The relative contribution $\alpha_k$ of a particular signal channel $S_k$ to the detector array signal $d_j$ may be obtained by projection onto the signal channel vectors:

$$(\alpha_k)=(a_{jk})^{-1}(d_j)$$

Hence, a plurality of data channels may be decoded simultaneously. Still other embodiment may make advantageous use of other correlations between signal channels of detector array 148. For example, time series correlations may be effectively utilized to help determine when a particular data channel is emitting, thereby increasing signal:noise ratio.

Still further embodiments may exploit the natural time scales of optical processes, in addition to their characteristic spectral properties, for identifying encoded information. For example, an interaction having a characteristically short lifetime may serve as a flag for a longer lifetime process in a time-gated measurement. For example, a Raman or infrared active emission process may serve as a self-calibrated clock for the detection of a luminescent transistor. Thus, in general, the present preferred embodiments will exploit both wavelength and time correlations for self-consistent signal identification and information decoding.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

We claim:

1. An apparatus for optical information storage comprising:
   a light source supplying light having a first predetermined wavelength;
   a data storage medium emitting light having said first predetermined wavelength and having a second predetermined wavelength, different from said first predetermined wavelength, in response to excitation by said light source;
   a processor providing wavelength discrimination of light emission from said data storage medium; and
   a light sensor detecting light emission from said data storage medium independently at said first and at said second predetermined wavelengths.

2. The apparatus of claim 1, wherein said first predetermined wavelength is selectable over a plurality of wavelengths.

3. The apparatus of claim 1, wherein said data storage medium further emits light having a plurality of wavelengths in response to excitation by said light source.

4. The apparatus of claim 3, wherein said light emission at a plurality of wavelengths comprises a plurality of substantially independently addressable optical processes.

5. The apparatus of claim 1, wherein said processor comprises an optical matched filter.

6. The apparatus of claim 5, wherein said optical matched filter comprises a spatial light modulator.

7. The apparatus of claim 1, wherein said light sensor comprises a multichannel light detector array.

8. The apparatus of claim 1, wherein said light source is time-gated.

9. An optical data storage medium comprising:
   a host material providing optical access for light excitation at a first predetermined wavelength; and
   a spectrally active material supported by said host material, said spectrally active material emitting light at said first predetermined wavelength and at a second predetermined wavelength in response to light excitation at said first predetermined wavelength.

10. The optical data storage medium of claim 9, further comprising a plurality of spectrally active materials supported by said host material, each spectrally active material emitting characteristic electromagnetic radiation substantially independently from each other in response to light excitation at said first predetermined wavelength.

11. The optical data storage medium of claim 9, wherein the light emission from said spectrally active material is modulated in accordance with an encoded information signal.

12. The optical data storage medium of claim 11, wherein an information signal is encoded in said spectrally active material during fabrication of said data storage medium.

13. A method of encoding data comprising the steps of:
    fabricating a host matrix comprising a material providing optical access for light excitation at a predetermined wavelength;
    fabricating a data storage matrix comprising a first data storage material responsive to said wavelength and a second spectrally active data storage material supported by said host matrix; and
    modulating the optical properties of said data storage matrix in accordance with a data signal.

14. The method of claim 13, wherein the step of modulating the optical properties of said data storage matrix is performed as part of the step of fabricating said data storage matrix.

15. An apparatus for reading optically encoded data comprising:
    a light source supplying light excitation having a first predetermined wavelength;
    a storage medium having optical properties providing emission of electromagnetic radiation in response to excitation by said light source, said electromagnetic radiation characterized as having said first predetermined wavelength and at least a second wavelength different from said first predetermined excitation wavelength; and
    and optical spectrum analyzer.

16. The apparatus of claim 15, wherein said optical spectrum analyzer comprises:
    a processor providing wavelength discrimination of said electromagnetic radiation; and
    a light sensor detecting said electromagnetic radiation independently at said first and at said second wavelengths.

17. The apparatus of claim 16, wherein said processor comprises a wavelength dispersive optical element.

18. The apparatus of claim 16, wherein said processor comprises an optical filter matched to at least a portion of said electromagnetic radiation.

19. The apparatus of claim 16, further comprising a time-gated signal processor.

20. The apparatus of claim 15, wherein said light source is tunable over a plurality of wavelengths.

21. An optical information storage medium comprising:
- a host material providing optical access to an incident light excitation;
- a first material supported by said host material that elastically scatters an incident light excitation; and
- a second material supported by said host material that inelastically scatters an incident light excitation.

22. A method of encoding information in an optical information storage medium comprising the steps of:
- modulating the optical properties of the medium providing elastic light scattering in accordance with a first portion of information to be encoded; and
- modulating the optical properties of the medium providing inelastic light scattering in accordance with a second portion of information to be encoded.

23. A method of decoding information in an optical information storage medium comprising the steps of:
- supplying an incident light excitation to said optical storage medium;
- sensing elastically scattered light from said storage medium;
- sensing inelastically scattered light from said storage medium; and
- detecting changes in spectral characteristics of said inelastically scattered light.

* * * * *